Sept. 9, 1958  V. POGIOLI  2,851,282
DEFORMABLE ELASTIC SUSPENSION FOR VEHICLE
Filed March 4, 1957

INVENTOR.
VITTORIO POGIOLI
BY
ATTORNEY

United States Patent Office 2,851,282
Patented Sept. 9, 1958

2,851,282

DEFORMABLE ELASTIC SUSPENSION FOR VEHICLE

Vittorio Pogioli, Bologna, Italy

Application March 4, 1957, Serial No. 643,681

Claims priority, application Italy March 5, 1956

2 Claims. (Cl. 280—124)

This invention relates to a suspension system for the axles of wheeled vehicles.

At the present time it is customary to suspend the axles of automotive vehicles, such as motor cars, by means of leaf springs and, despite the fact that this type of system is widely used, it cannot be said that it is the ideal manner of suspension. For proper operation it is necessary to provide separate shock absorbers, and the leaf springs elongate with the swinging oscillations of shackles which are similar to uncontrolled displacements of the axles of the wheels, and defective operation is a result.

It is an object of the present invention to provide a suspension which avoids the disadvantages and drawbacks of suspensions heretofore known.

The present invention provides a self-shock-absorbing suspension which makes use of elastic bearings which, aside from being of a non-complicated construction, are lighter, and much more functional than leaf springs, since they do not require additional shock absorbers. The suspension of this invention makes it possible for the vehicle to hold the road securely and continuously and provides a delicate springing action whether the vehicle is empty or fully loaded.

In accordance with the invention, there is provided a suspension for a vehicle which is composed of a casing adapted to be secured to the vehicle chassis, an elongated pin integral with the axle of the vehicle and extending into the casing, plastic elastic means confined in the casing and engaging and receiving the free end of the pin, and a bearing unit surrounding the pin at the entrance of the casing. The bearing unit includes rigid side portions connected to the casing, a rigid central element surrounding the pin, and a plastic elastic intermediate unit connecting the rigid central element with the rigid side portions.

The advantages and features of the invention will be readily apparent from the following detailed description and from the accompanying drawing which shows schematically and merely by way of example, an illustrative embodiment of the invention.

The suspension unit of the invention, independently of the axle of the vehicle, is comprised of a hollow casing 1, which is suitably rectangular in cross-section and is adapted to be secured to the vehicle chassis, as by welding, riveting, bolting, or the like. At the lower end of the casing there is secured a collar or elastic bearing 2.

Figure 1:
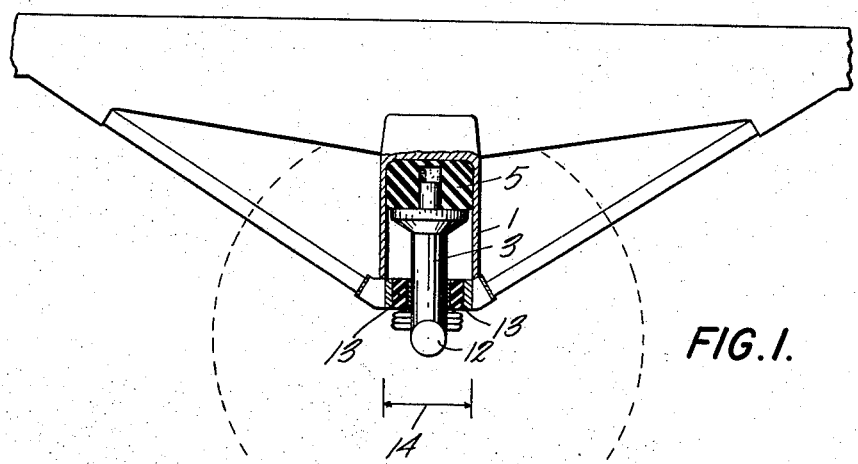
Fig. 1 is a side elevational view, partly in section, of a suspension embodying features of the invention, mounted on a typical vehicle.
Figure 2:
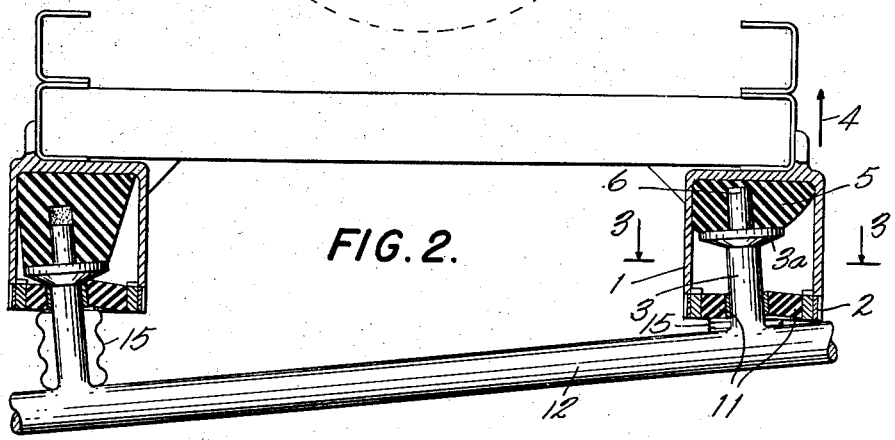
Fig. 2 is a transverse sectional view of the vehicle chassis showing the combination of two suspension units of the invention connected to the axle of the vehicle.
Figure 3:
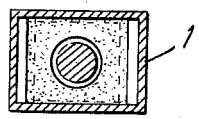
Fig. 3 is a cross-sectional view of the right-hand assembly of Fig. 2 taken approximately along the line 3—3 of Fig. 2.
Figure 4:
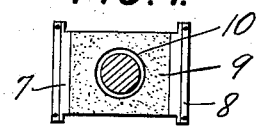
Fig. 4 is a bottom view of the lower elastic bearing portion of the suspension, the rod connected to the axle being shown in section.

As seen in Fig. 4, the collar or elastic bearing 2 is formed from two metallic side members 7 and 8 provided with openings adapted to receive securing means for connecting the side members to the casing 1, an intermediate portion 9 formed from a plastic elastic material such as rubber, and a rigid metallic bearing ring 10. These three elements or component parts of the suspension unit are united into an integral body having a rigid center, rigid peripheral portions and an elastic intermediate portion. Extending through the central bearing ring 10 of the bearing 2 is a guide pin or shaft 3 which is integrally united with the axle 12 and is capable of displacements or upward vertical translations in the direction of the arrow 4 and in the opposite direction. The guide pin 3 is formed with a circular abutment 3a which engages an elastic pad 5 formed from an elastic plastic material, such as rubber, housed in the casing 1 and formed with a recess to receive the rod-like end 6 of the guide shaft 3. The elastic plastic portion 9 of the above-mentioned bearing 2 has a width 11 in the direction of the axle 12 of the wheels, as seen in Fig. 2, which is greater than its width 13 in the longitudinal direction of the vehicle, as seen in Fig. 1, so that stresses due to the friction of the rolling action and of the braking action of the wheels are neutralized by the lesser quantity of elastic plastic material existing along the width 13 and by the lesser amount of space 14 which limits displacements in that direction. As will be seen in Fig. 1, the bearing of this invention and its casing and associated parts are suitably braced by struts, or the like, which are rigidly connected to the vehicle chassis.

In Fig. 2, wherein the axle has been moved upwardly into the right-hand bearing and has been moved downwardly in relation to the left-hand bearing, the relative relationships of parts during compression and expansion in two suspensions connected to the same axle are readily seen. A bellows-like sleeve 15 which is readily compressed, as seen at the right in Fig. 2, is provided around each pin 3 to prevent dirt and other foreign matter from entering the casings 1.

Each suspension unit as illustrated in the drawing takes the place of a leaf spring, the guide pin or shaft 3 being an integral part of the axle 12 of the wheels. At the same time each suspension takes the place of a shock absorber.

The plastic elastic material of the pad 5 is relatively porous and is therefore susceptible of being compressed to a considerable extent and reduced in volume. The amount of porosity may be varied among different vehicles so as to provide a delicate springing action for small automotive vehicles as well as for heavy duty automotive vehicles, whether the latter are empty or fully loaded.

It will be obvious that various changes and modifications other than those specifically indicated above may be made in the embodiment illustrated without departing from the scope of the invention as defined in the appended claims, and it is intended, therefore, that all matter contained in the foregoing description and in the drawing shall be interpreted as illustrative only and not as limitative of the invention.

What I claim and desire to secure by Letters Patent is:

1. A suspension system for a vehicle comprising, in combination with an axle of the vehicle, a casing adapted to be secured to the vehicle chassis, an elongated pin integral with the axle and extending into said casing, plastic elastic means confined in said casing and engaging the free end of said pin, and a bearing unit surrounding said pin at the entrance of said casing, said bearing unit including rigid side portions connected to said casing, a central rigid element surrounding said pin, and an intermediate plastic elastic unit connecting said central rigid element with said rigid side portions, said bearing unit having a greater dimension in the direction of the axis of the axle and a lesser dimension in a direction transversely of the axis of the axle.

2. A suspension system for a vehicle comprising in combination with an axle of the vehicle, a casing adapted to be secured to the vehicle chassis, an elongated pin integral with the axle and extending into said casing, plastic elastic means confined in said casing and engaging the free end of said pin, said pin carrying an abutment for engagement with said plastic elastic means, and a bearing unit surrounding said pin at the entrance of said casing, said bearing unit including rigid side portions connected to said casing, a central rigid element surrounding said pin, and an intermediate plastic elastic unit connecting said central rigid element with said rigid side portions, said bearing unit having a greater dimension in the direction of the axis of the axle and a lesser dimension in a direction transversely of the axis of the axle.

References Cited in the file of this patent

UNITED STATES PATENTS

| | | |
|---|---|---|
| 915,326 | Beatty | Mar. 16, 1909 |
| 2,360,619 | Peterman | Oct. 17, 1944 |
| 2,689,136 | Hendrickson | Sept. 14, 1954 |